Oct. 31, 1933.  H. BOLAS  1,933,307
AIRCRAFT
Filed Dec. 31, 1931   3 Sheets-Sheet 1

INVENTOR
HAROLD BOLAS
BY
ATTORNEY.

Oct. 31, 1933.  H. BOLAS  1,933,307
AIRCRAFT
Filed Dec. 31, 1931   3 Sheets-Sheet 2
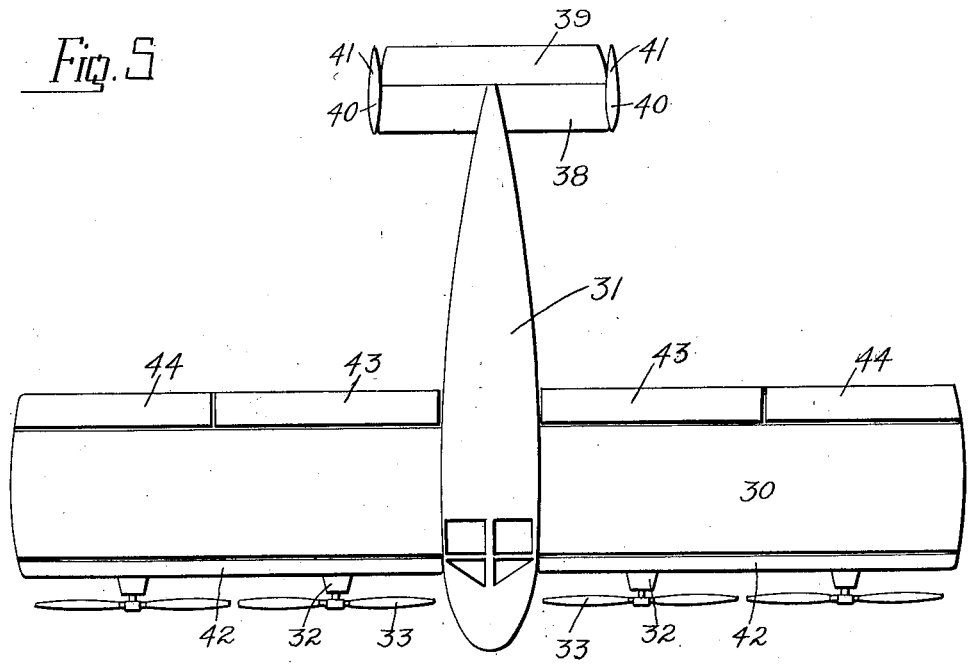
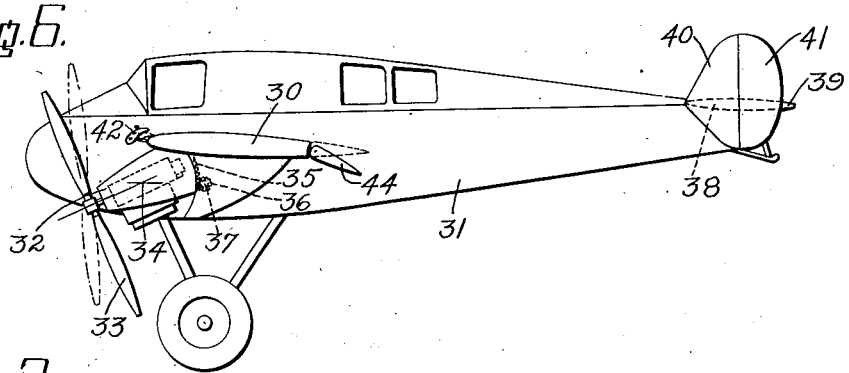
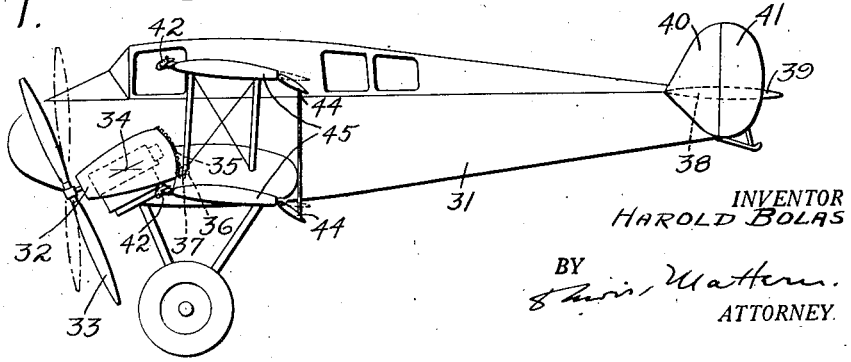
INVENTOR
HAROLD BOLAS
BY
ATTORNEY.

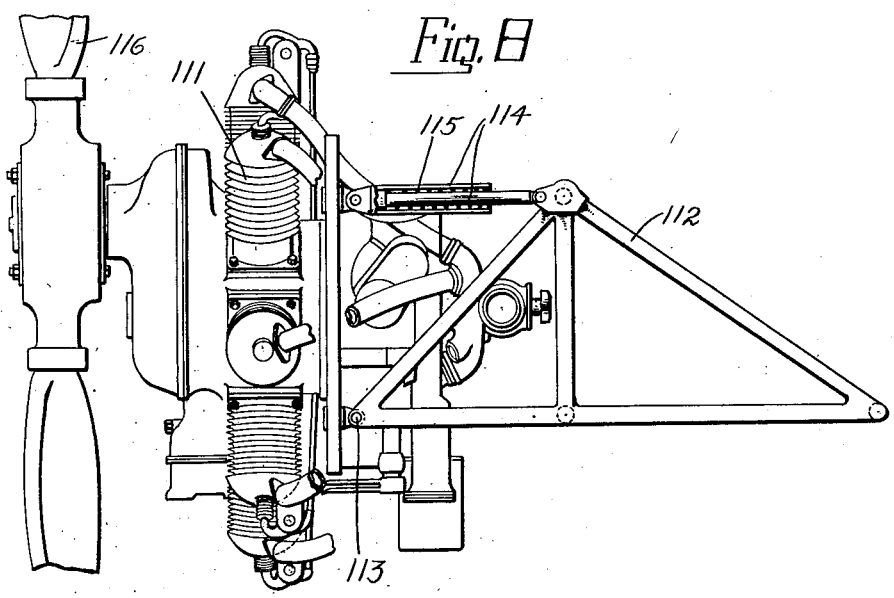
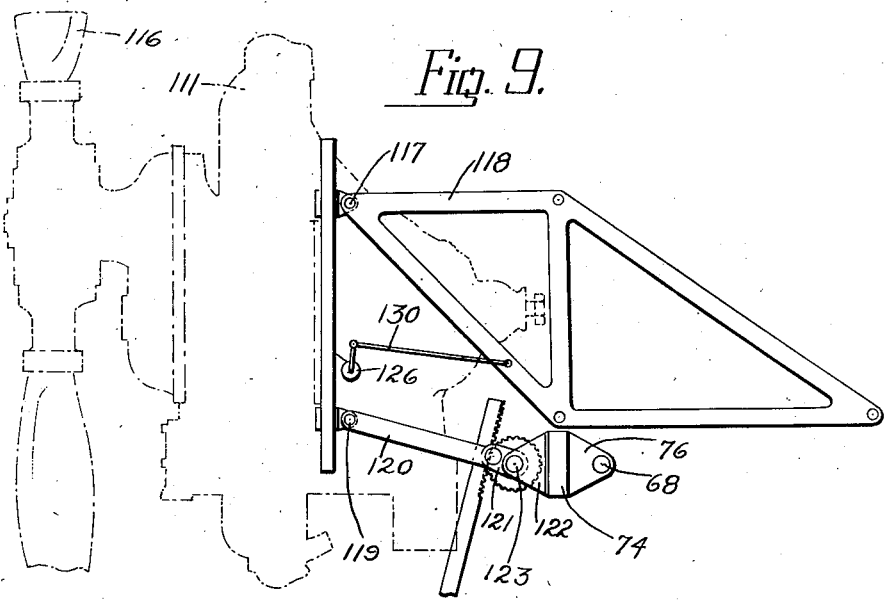
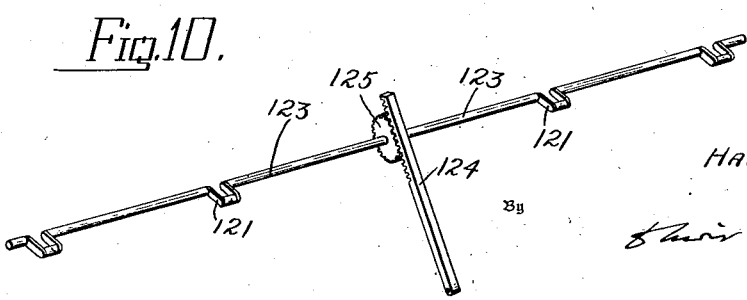

Patented Oct. 31, 1933

1,933,307

UNITED STATES PATENT OFFICE 1,933,307

AIRCRAFT

Harold Bolas, Providence, R. I.

Application December 31, 1931. Serial No. 584,214

18 Claims. (Cl. 244—14)

REISSUED
APR 21 1936

The present invention relates to improvements in aircraft and is a continuation in part of my co-pending application for Aircraft, filed November 7, 1930, Serial Number 493,965. The invention has for an object to provide heavier-than-air aircraft, which is enabled to "hover", i. e., be supported at little or no forward speed relative to the ground, and which may ascend or descend substantially vertically, while at the same time retaining the usual load carrying and top speed characteristics of aircraft heretofore in use. My improvements relate especially to the type of aircraft in which it has been proposed to reduce the stalling or lowest flying speed by causing the airscrew or propeller slip stream to act over substantially the whole of the main supporting surface to produce lift.

It has been heretofore proposed in this connection to dispose a number of air-screws along the leading edge of the wing in such manner that the slip stream acted on substantially the whole of the wing or main lifting surface. It has also been proposed to enable aircraft to hover and ascend and descend vertically by various helicopter arrangements in which the plane of rotation of the air-screws is substantially horizontal, the downward thrust directly supporting the weight of the machine. In these arrangements the slip stream is thrown entirely clear of the control surfaces if these are situated in the normal position, and hence control of the usual type cannot be resorted to.

It has been further proposed to provide air-screws having a fixed inclination to the body so as to have upward and forward components of thrust upon the wing or main lifting surfaces, the angle of which was adjustable, but in this case the fore and aft and directional control surfaces were entirely clear of the slip stream and adequate control at slow forward speeds by such means was not possible. Moreover in the high speed or low incidence condition, depending on the angular position of the wing, either the rear part of the body or fuselage would be cocked up at an attitude leading to excessive parasitic resistance, or the air-screws themselves would be inclined to the flight path at a large angle, resulting in reduction of propulsive force and excessive vibration.

It has also been proposed to provide a single central engine and propeller pivotally mounted in the nose of the body or fuselage, and controllable in flight to change the angle of the axis of rotation. In the slow speed condition the airscrew was pivoted upwards to have upward and forward components of thrust, while at the same time a small portion of the lifting surface disposed in the slip stream and pivoted relatively to the body was acted upon by the slip stream to produce extra lift. In this case also the fore and aft and directional control surfaces were clear of the slip stream and adequate control became impossible while at the same time the extra lift derived from the movable lifting surface in the slip stream was of a relatively small order.

It is proposed in the present invention to dispose the control surfaces so that they are at all times in the slip stream of the air-screws and adequate control at little or no forward speed is made possible.

Among the objects of my invention are to reduce the minimum flying speed to a value below that obtaining in present heavier-than-air aircraft while retaining usual top speed characteristics, to reduce the stalling speed in still air to substantially zero, causing the machine to hover, while still retaining adequate control and the usual top speed characteristics, and to sustain an increased total weight per horse power in hovering, low speed, and top speed flight, so that a substantial useful load can be carried. Another object is to provide an aircraft which can descend steeply to a landing, or ascend steeply from a confined space, while retaining the usual top speed characteristics of normal aircraft.

Other objects are to provide improved top speed characteristics while retaining the same stalling speed and load carrying capacity of normal aircraft, to obtain an increase in useful load carrying capacity while retaining the same top speed and low speed characteristics of normal aircraft, and to provide improvements over normal aircraft in stalling speed, top speed and useful load carrying capacity.

With the above and other objects in view embodiments of my invention are shown in the accompanying drawings, and these embodiments will be hereinafter more fully described with reference thereto and the invention will be finally pointed out in the claims.

In the drawings:

Fig. 5 is a plan view of an aircraft of monoplane type, according to one embodiment of my invention.

Fig. 6 is a side elevation thereof, and showing in dotted lines an adjusted position of the engine units and propellers.

Fig. 7 is a side elevation, illustrating an aircraft of bi-plane type, embodying the invention.

Fig. 8 is a side elevation of an engine spring mounting for automatically varying the air-screw axis with variation of forward speed during flight.

Fig. 9 is a side elevation of an alternative form of engine mounting, in which the angle between the air-screw axis and main lifting surface is mechanically controlled.

Fig. 10 is a perspective view of a shaft and gearing for operating the engine mountings as illustrated in Fig. 9.

Similar reference characters indicate corresponding parts throughout the several figures of the drawings.

Figure 1:
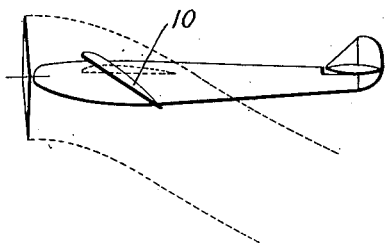
Figs. 1 to 4 are comparative diagrammatic side elevational views of airplanes in flight, Figs. 1 and 2 showing two previously known designs, and Figs. 3 and 4 showing a design according to the present invention.

In Fig. 1 of the drawings there is shown diagrammatically an airplane of previously known type, in which the wing unit 10 can be swiveled relatively to the fuselage to present a large angle of attack to the slip stream in the slow speed condition as shown in full lines. In this case the slip stream is diverted downwards by the wing, producing upward lift, but in so doing is thrown clear of the stabilizer and rudder, and hence adequate control is impossible by this means.

Figure 2:
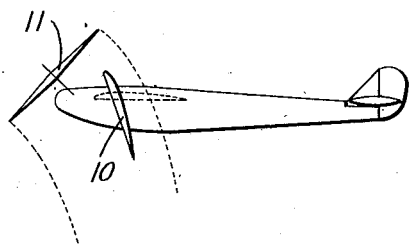

In Fig. 2 another previously known design is shown diagrammatically, in which the axis of the air-screw 11 is adjustable upwards in relation to the fuselage, so that the thrust of the air-screw has components upwards and forwards. The wing 10, as in the design shown in Fig. 1, is adjustable so as to present a positive angle of attack to the slip stream and thus assist in producing upward lift. Here again the slip stream completely misses the stabilizer and rudder and adequate control by normal means becomes impossible. If only the air-screw is swivelled, the wing remaining at a small angle to the fuselage, as shown in dotted lines, the slip stream acts at a negative angle to the wing and a downward force is produced acting in opposition to the upward component of thrust of the air-screw, and hence little or no useful gain results.

Figure 3:
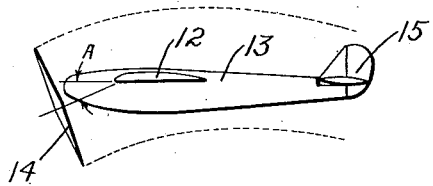

In Fig. 3 I have shown diagrammatically an airplane design, according to one embodiment of my invention, in which the wing 12 is fixed rigidly to the fuselage 13 and the air-screw 14 is so arranged that its axis presents a positive angle of attack in relation to the wing. In this case it will be seen that the slip stream after passing over the wing also submerges the auxiliary control surfaces, i. e. stabilizer, elevator, fin and rudder, indicated generally as 15, and hence adequate and complete control by slip stream action becomes practicable.

Figure 4:
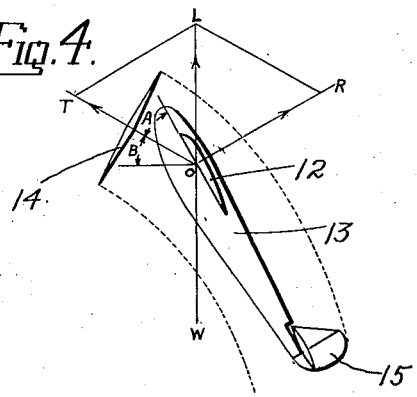

The attitude of the aircraft to the horizontal, as shown in Fig. 3, would not represent a state of equilibrium at low forward speeds and when hovering, and under these conditions the machine would assume a position such as shown in Fig. 4. In this diagram OT represents the thrust of the air-screw, OR the total resultant force on the machine produced by the slip stream action, and OW the weight of the machine acting downwards. The force OL acting upwards is that due to the combination of OT and OR, and in the illustrated arrangement of my invention this is equal in magnitude to OW, thus producing a state of equilibrium. It will be observed that a proportion of the total lift is derived from the upward component of the air-screw thrust, and the remainder from the action of the air stream on the airplane proper—chiefly on the main lifting surface. Also that the forward acting component of thrust is balanced by the backward component of drag, thus resulting in no forward motion relative to still air.

In comparing the design shown in Fig. 2 and that of the present invention shown in Fig. 4 it will be seen that in the latter case the control surfaces lie in the path of the air flow from the wing, and hence at little or no forward speed the machine is under complete control when employing the usual auxiliary surfaces, i. e., stabilizer and elevator, fin and rudder. In the Fig. 2 design, on the other hand, the control surfaces are clear of the path of the slip stream, and as before pointed out adequate control is impossible.

If it is assumed that the angle "A" between the wing and air-screw axis is fixed, then this angle should not be excessive, since in the high speed condition, as illustrated in Fig. 3, the air-screw axis should not be unduly inclined downwardly. In the hovering condition, Fig. 4, the angle "B"—the inclination of the air-screw axis to the horizontal—is for a given aerofoil section and arrangement, dependent upon the angle "A", and should also not be excessive, its value being best determined by the greatest angle at which the engine will function satisfactorily. The combined angle "A" plus "B" represents approximately the angle of the body or fuselage to the horizon, and in general practice would be about from 50 to 60 degrees.

It has so far been assumed that the angle existing between air-screw axis and wing aerofoil is fixed and constant. If it is desired, however, to increase the lifting efficiency in the hovering attitude, and at the same time reduce the angle of the air-screw axis to the horizontal under these conditions, the power units may be arranged to be pivotally attached to their mountings, and mechanism provided, such as hereinafter shown in detail, which will enable the angle "A'" between the air-screw axis and wing to be increased when passing from the low incidence or high speed condition to the high incidence or low speed condition.

Considering Fig. 4 it will be seen that the optimum lift obtainable from each air-screw is equal to its thrust, for if the whole of the slip stream could be dealt with by the wing and deflected downwards without loss, so as to leave the wing in a truly vertical direction, the total momentum in the stream would equal the lift, and since the total momentum in the stream is also the air-screw thrust, thrust and lift must be equal in the optimum case. In practice, however, it is not possible to avoid some loss of energy owing to interaction of wing and slip stream, and hence the whole of the air-screw thrust cannot be developed as lift.

I therefore find it highly desirable in carrying out my invention to employ an air-screw and engine design by which the static thrust per horse-power of the air-screw will be as large as possible when taking into consideration other limitations imposed by design. As is well known static thrust per horse-power depends upon diameter, revolutions per minute, pitch, blade thickness and shape, and for a given power, static thrust per horse power is greater when the revolutions per minute are reduced and the diameter of the air-screw is increased.

I preferably employ for this purpose a low speed engine or one having a reduction gear, the latter being desirable from a weight per horse power point of view. As the thrust horse power is greater the smaller the diameter of the individual airscrew, I preferably divide the total power available into as large a number of individual units as is compatible with other aspects of the design.

As before pointed out, the pitch of the airscrew blade is a factor in static thrust per horse power, and for high specific static thrust the pitch should be relatively small, thus enabling the air-screw to work at full engine revolutions, and under efficient conditions. A small pitch, however, would be undesirable under high speed conditions, and I therefore propose to employ a variable pitch air-screw, the pitch of which can be controlled in flight, thus enabling a reasonable weight per horse power to be maintained in hovering flight, while in no way impairing efficient high speed flight. Inasmuch as variable pitch air-screws and mechanisms for controlling them in flight are well known I have not shown the pitch changing means, but it will be understood that any suitable type may be employed.

The air-screw blades should preferably have thin, efficient aerofoil sections, and should be as narrow in proportion to propeller diameter as strength considerations permit. Light alloy metal blades are suitable for the purpose.

From the foregoing it will be seen that in a preferred embodiment of my invention, capable of hovering and high speed flight while carrying a substantial useful load, I propose to provide a plurality of air-screws, preferably of geared down type, and having their pitch variable in flight.

As regards the wing unit, the individual aerofoils comprising this should be arranged to present a positive angle of attack to the air-screw slip stream, and the greater this angle of attack, the smaller will be the angle of the air-screw axis to the horizon in the hovering condition. The conditions under which the aerofoil system functions are different from those obtaining in the case of normal aircraft, in which the aerofoils are submerged in a stream of infinite depth, whereas in the present invention the aerofoils function in a limited stream, whose total depth is defined by the diameter of the air-screws. It is therefore important in carrying out my invention that the aerofoil be capable of dealing with the major portion of the stream, and of turning this through as large an angle as possible without stalling. To this end I propose, as will hereinafter be described in detail, to employ trailing edge flaps operable in flight, and under certain conditions to use slots or pilot planes, for example of the type known as Handley-Page. The trailing edge flaps in the case of employment of a fixed angle of incidence between the air-screw axis and wing, will enable this angle to be retained at a value which will not involve undue downward inclination of the air-screw axes in high speed flight. In operation the flaps are pulled downwards through a considerable angle in the hovering condition, and are adjusted when flying at high speed.

In one embodiment of the invention, illustrated in Figs. 5 and 6, the wing unit comprises a monoplane structure 30 fixed to and extending at each side of the body or fuselage 31, having a number of engine units 32 arranged along the span or length of the wing, in such manner that the slip stream from the air-screws 33 embraces as great a proportion of the wings as possible, the engine units being mounted for pivotal movement about an athwartship axis 34. In hovering and low speed flight the engines and the air-screw axes will be disposed at a downward inclination, as shown in full lines, Fig. 6, substantially as shown in the diagrams, Figs. 3 and 4, while in high speed flight they may be adjusted so that they are substantially parallel to the axis of the fuselage and at a slight downward angle to the wing, as shown in dotted lines. Any suitable mechanism or gearing may be employed for varying the angle of the engines, as for instance arcuate racks 35 and pinions 36, as shown in dotted lines, Fig. 6, the pinions being mounted on a common shaft 37 extending to the cockpit where it may be rotated by the pilot.

The fuselage is provided at its end with a tail or empennage unit comprising a stabilizer 38, elevator 39, fins 40 and rudders 41, this unit being in the slip stream from the air-screws, in a similar manner to the design illustrated in Figs. 3 and 4.

The wing 30 is provided at its forward edge with wing slot pilot planes 42 and at its trailing edge with inner flaps 43—43 and outer flaps 44—44, the latter in addition to being capable of moving with the inner flaps, being adapted to have independent movement so that they may function as ailerons. Any suitable known mechanism may be employed to operate these flaps. The pilot planes 42 are automatic in action and take the form of small aerofoils freely hinged about their centers of gravity and restrained only by stops at the two ends of the working range. In the high speed condition the pilot planes trail freely under the action of the air flow, and do no more than add resistance equal to the skin friction of the pilot planes themselves. In the low speed condition they come into contact with the upper stops and then act in a similar manner to slots to delay the stalling angle at large angles of incidence.

In Fig. 7 I have illustrated a modification similar in general to that shown in Figs. 5 and 6 but in which the wing unit 45 is of bi-plane type, the engine units in this case being preferably arranged upon the upper side of the lower plane.

The engines 32 are preferably of light weight per horse power, and of geared down type, and the air-screws are preferably variable pitch type operable by suitable means in flight.

In Fig. 8 I have shown an engine mounting for use in connection with embodiments of the invention where it is desired to automatically change the angular relation of the slip stream to the wing. The motor 111 illustrated is of radial type and is attached to the supporting structure 112 at four points, the two lower points 113 constituting a hinging axis. Elastic members 114 provided with internal compression springs 115 attach the upper points to the structure 112. The springs 115 are given an initial compression, so that at top speed or at any chosen speed the engine may be said to be in its normal position. As forward speed is reduced below the predetermined speed, the increasing thrust extends the members 114, thus inclining the air-screw axis downwards with respect to the wing and resulting in an increased angle of incidence between the slip stream and the wing. The air-screw 116 is shown as driven by reduction gearing.

In Fig. 9 I have shown an arrangement whereby angular adjustment of the engines is accomplished mechanically in conjunction with the gear provided for changing the relative angle between the wings and body. In this embodiment the two upper points of attachment 117 of the engine to the supporting structure 118 form the hinging axis, this arrangement being such as to reduce loads on the mechanism when operating. The engine 111 is of geared type having the air-screw axes above the center line of the engine. By hinging about the two upper points, the moments about the hinges due to air-screw thrust and engine weight act in opposite directions and can be made to substantially balance one another for some predetermined value of the thrust. The two lower attachment points 119 are connected by links 120 to a crank 121 arranged to rotate in bearings 122 which are preferably secured to the front spar 74 of the lower wing. The crank 121 is arranged to swivel through an angle of 180° so that the mechanism is toggled in the two extreme positions of the gear, and loads applied to the mountings are therefore not transmitted through the operating gear in these positions.

As shown in Fig. 10 the cranks 121 for the several engines are connected together by co-axial shafts 123 having bearing in the bearings 122 secured to the front spar 74 of the wing, the whole being operated through a central rack 124 provided in the body and meshing with a pinion 125 secured centrally upon the shaft 123. The lower end of the rack 124 is pivotally connected to the body and it will be readily seen that relative motion of the body and wing about the axis 68 will rotate the pinion 125 and shaft 123 and procure the desired engine movement.

The means for varying the air-screw pitch can be of any suitable type, as for instance of the well known type in which the pitch change is effected by the operation of a two way cock acting on the oil pressure system of the engine.

Where movable engine units are employed, advantage may be taken of the movement of the engines relative to the wing to control the oil cocks. Such an arrangement is shown diagrammatically in Fig. 9 where the oil cock 126 mounted on the engine is connected by a link 130 to the structural support 118. Obviously relative movement of the engine causes the oil cock to be operated and the air-screw pitch varied.

I have illustrated and described preferred and satisfactory embodiments of my invention but it will be obvious that changes may be made therein, within the spirit and scope thereof, as defined in the appended claims.

Having thus described my invention, what I claim and desire to secure by Letters Patent is:—

1. In an aircraft, a wing comprising a main body section and means for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

2. In an aircraft, a wing comprising a main body section and means operable during flight for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

3. In an aircraft, a wing comprising a main body section and means for varying the aerodynamic characteristics of the wing and extending over the whole wing spread, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

4. In an aircraft, a wing comprising a main body section and trailing edge means for varying the aerodynamic characteristics of the wing including movable aileron flap sections contiguous to the wing ends and separately movable flap means intermediate said aileron flap sections, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

5. In an aircraft, a wing comprising a main body section and means for varying the aerodynamic characteristics of the wing, a tail control surface rearwardly of the wing and in the path of the slip stream passing over said wing, variable pitch air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and means for varying the pitch of said air screw means during flight.

6. In an aircraft, a wing comprising a main body section and means for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and an engine having reduction gearing for driving said air screw means.

7. In an aircraft, a wing comprising a main body section and means for varying the aerodynamic characteristics of the wing, a tail control surface rearwardly of the wing and in the path of the slip stream passing over said wing, variable pitch air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, an engine having reduction gearing for driving said air screw means, and means for varying the pitch of said air screw means during flight.

8. In an aircraft, a wing comprising a main body section and means for varying the aerodynamic characteristics of the wing, a tail control surface rearwardly of the wing and in the path of the slip stream passing over said wing, variable pitch air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, an engine having reduction gearing for driving said air screw means, means for varying the pitch of said air screw means during flight, and means for varying the aerodynamic characteristics of said wing during flight.

9. In an aircraft, a wing comprising a main body section and means for varying the aerodynamic characteristics of the wing, a tail control surface rearwardly of the wing and in the path of the slip stream passing over said wing, variable pitch air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, an engine having reduction gearing for driving said air screw means, means for varying the pitch of said air screw means during flight, means for varying the aerodynamic characteristics of said wing during flight, and means for varying said angle of the air screw axis to the chord of said main body section during flight.

10. In an aircraft, a wing comprising a main body section and means for varying the aerodynamic characteristics of the wing, said main body section having an auxiliary wing located at its leading edge adapted to be separated from said main body section at a predetermined angle of incidence to produce a slot, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

11. In an aircraft, a pair of superimposed wings each comprising a main body section and means for varying the aerodynamic characteristics of the wing, a tail control surface rearwardly of the wings and in the path of the slip stream passing over said wings, air screw means having its axis at such angle to the chords of the main body sections of said wings that when said axis is horizontally disposed the main body sections always present a positive angle of incidence to the horizon and arranged to develop a slip stream substantially enveloping the whole of said wings and tail control surface.

12. In an aircraft, a fuselage, a wing having wing sections extending at the respective sides of said fuselage and each comprising a main body section and trailing edge means for varying the aerodynamic characteristics of the wing and including movable aileron flap sections contiguous to the wing ends and separately movable flap sections extending between said aileron sections and the fuselage, a tail control surface rearwardly of the wing and in the path of the slip stream passing over said wing, air screw means having its axis at such angle to the chords of the main body sections of said wing that when said axis is horizontally disposed the main body sections always present a positive angle of incidence to the horizon and arranged to develop a slip stream substantially enveloping the whole of said wing and tail control surface.

13. In an aircraft, a wing comprising a main body section and means for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and means for varying said angle of the air screw axis to the chord of said main body section during flight.

14. In an aircraft, a wing comprising a main body section and means for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and means adapted to automatically increase said angle of the air screw axis to the chord of said main body section in passing from high speed to low speed conditions.

15. In an aircraft, a wing comprising a main body section and means for varying the aerodynamic characteristics of the wing, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and means actuated by the air screw thrust adapted to automatically increase said angle of the air screw axis to the chord of said main body section in passing from high speed to low speed conditions.

16. In an aircraft, a wing comprising a main body section and a trailing edge flap, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

17. In an aircraft, a wing comprising a main body section and variable trailing edge flap means extending over the whole wing spread, a tail control surface rearwardly of the wing and in the path of the slip stream passing over said wing, air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface.

18. In an aircraft, a wing comprising a main body section and a trailing edge flap, a tail control surface rearwardly of the wing and in the path of the slip stream passing over said wing, variable pitch air screw means having its axis at such angle to the chord of the main body section of said wing that when said axis is horizontally disposed the main body section always presents a positive angle of incidence to the horizon and arranged to develop a slip stream substantially enveloping the whole of said wing and tail control surface, and means for varying the pitch of said air screw means during flight.

HAROLD BOLAS.